Patented Oct. 2, 1951

2,569,539

UNITED STATES PATENT OFFICE 2,569,539

FRICTION MATERIAL

Harold W. Schultz, Dayton, Ohio, assignor to General Motors Corporation, Detroit, Mich., a corporation of Delaware No Drawing. Application October 30, 1947, Serial No. 783,211

3 Claims. (Cl. 260—17.2)

This invention relates to friction material and is particularly concerned with friction facings which include predetermined amounts of precast copper-lead powder.

It is therefore a primary object of this invention to provide an improved friction material for clutches and the like which is smooth in operation, and which has high wear resistance, said qualities being derived through the inclusion of a copper-lead powder of a precast nature in said material and uniformly dispersed therethrough.

Further objects and advantages of the present invention will be apparent from the following description.

Friction material having metal particles dispersed therethrough, such as copper powder and lead powder is well known in the art. Such materials have been used in brake linings and the like for some time. This invention is basically directed to an improved friction material for use in clutches and the like and in this connection the problems involved are considerably different than in connection with brake linings, since the material must be smoother in operation in view of reduced pressures involved during the engaging and disengaging portions of the clutching action. The invention disclosed herein may be used in any type of clutch but is preferably used in connection with wet clutches wherein a fluid is provided for maintaining the clutch plates cool, increasing the life thereof and for providing a cushioning effect upon engagement of the plates. In application Serial No. 712,101, filed November 25, 1946, now Patent 2,553,215, I have disclosed one type of friction material which yields very satisfactory results in connection with wet clutch plates. This material includes cotton flock and granulated cork together with a resin type of binder and a friction-fortifying material. Similar types of friction materials may be made which include asbestos fiber in place of the flock and which include other materials in place of cork.

Many patents have been granted on friction materials of various natures and in this connection the specific formula for the basic friction material is of no importance here.

My invention is primarily directed to the inclusion in a friction material of the molded type of a metal powder wherein each particle of powder includes copper and lead in intermingled form. Such a powder may be made by atomizing copper and lead in the molten state or by comminuted copper-lead bar stock. This is an important factor of the invention and differentiates the powder from the conventional electroplated types wherein the copper or the lead forms a coating over the other metal. This latter type of powder I have found to be unsatisfactory for the use described. The specific copper-lead powder which I use may be termed precast copper-lead powder and such terminology is understood to define a powder wherein the copper and lead are completely intermingled throughout each particle and thereby present wear surfaces on each particle having copper and lead intimately dispersed. I have found that this copper-lead powder, preferably smaller than 75 mesh size, may vary in content from 50 to 80% copper and from 50 to 20% lead and still yield satisfactory results. The particle size is not of great importance and the maximum figure noted above was arrived at through the limitation in thickness of the facing. The preferred content of the powder is from 60 to 70% copper and from 40 to 30% lead, with the 65-35 ratio yielding optimum results. The quantity of powder may vary from 15 to 35% by weight of the friction material for satisfactory results in certain types of automotive clutches. In the preferred embodiment for this use about 25% by weight is the most desirable figure.

It is apparent that in many applications, the copper-lead precast powder may be used in greater quantities than those specifically mentioned, for example, up to 75%, providing the friction characteristics of the element meet specific requirements.

Precast copper-lead powder has various functions in the friction facing. The lead simulates a lubricating material in action thereby yielding a smooth operating clutch which does not grab and which on the other hand takes a firm hold upon full engagement. The lead has a tendency to smear at the exposed surface of each particle to yield a very desirable friction facing. On the other hand, the copper which is interspersed with the lead prevents any excessive wear of the facing thereby yielding a longer wearing article without making the surface of the article of a nature which would be unsatisfactory in a clutch. For example, if copper alone is used, the clutch has too hard a surface and although the wear resisting properties are good, the engagement thereof is critical and does not yield the desired smooth action and in many cases, causes galling at the engaging surfaces. If, on the other hand, lead powder alone is used the clutch while being smooth in action wears rapidly, lacks desired frictional properties and needs frequent replacement. By interspersing the two metals intimately within each particle, the desirable conditions arising through the use of the separate metals are combined to yield highly satisfactory facing. In this connection, if copper and lead are mixed in proportions similar to those mentioned as separate powders, the action of the clutch is not the same as with precast copper-lead since the copper and lead have uneven wearing qualities which will create erratic output characteristics throughout the life of the clutch.

Furthermore, the precast copper-lead has an effective hardness of less degree than pure copper. This modification in hardness yields more desirable operational characteristics and better conformability. The ultimate mixture of copper and lead in the precast powder provides lead immediately adjacent the copper at all times, which prevents galling due to the smearing action of the lead in the copper.

It is to be understood that the copper-lead powder in precast condition may be used with any satisfactory clutch facing material which includes a binder. It may be added to the formula mentioned in my copending application or it may be used in formulas as follows:

*Formula #1*

40 parts copper-lead powder precast
40 parts asbestos fiber
10 parts bituminous coal
7 parts 590 cardolite dust
45 parts thermosetting resin binder This formula may be expanded as follows:

*Formula #2*

30 to 80 parts copper-lead powder precast
30 to 80 parts asbestos fiber
3 to 12 parts cardolite dust
2 to 20 parts bituminous coal
35 to 60 parts thermosetting resin binder.

Formulas Nos. 1 and 2 may be further modified by the inclusion of silica powder from 5 to 10 parts, barium sulphate powder from 5 to 15 parts, mica from 1 to 5 parts, graphite from 2 to 8 parts, butyl stearate from 1 to 5 parts.

As a binder, any suitable resin may be used which will withstand operating temperatures and in this connection, the binder should withstand surface temperatures up to about 650° F. Obviously, any other satisfactory friction material may be fortified with copper-lead powder to improve its frictional characteristics and to increase its life. In all cases, the compounding ingredients in the facing are milled together with the metal product and are then either extruded or molded in sheet or strip form under heat and pressure.

While the embodiments of the present invention as herein disclosed, constitute preferred forms, it is to be understood that other forms might be adopted, all coming within the scope of the claims which follow.

What is claimed is as follows:

1. A friction facing material for use in clutch plates and the like, comprising a clutch facing element formed from a molded mixture of a thermosetting resin and a filler taken from the class consisting of cotton flock, granulated cork and asbestos fiber and having metal powder uniformly dispersed therethrough consisting of, precast copper-lead powder in quantities of from 15 to 75% by weight of the element and wherein each particle of the powder includes copper and lead intimately interspersed therethrough in quantities of from 50 to 80% copper and from 50 to 20% lead.

2. A friction facing material comprising in combination a clutch facing element formed from a molded mixture of a thermosetting resin and a filler taken from the class consisting of cotton flock, granulated cork and asbestos fiber and having metal powder dispersed uniformly therethrough consisting of, precast copper-lead powder wherein each particle of copper-lead powder has 65% copper and 35% lead completely interspersed therethrough, said copper-lead powder being used in quantities approximately 25% by weight of the facing.

3. A friction facing material, comprising in combination; a sheeted and heat cured mixture comprising as its major ingredients, a thermosetting resin binder, a filler taken from the class consisting of cotton flock, granulated cork and asbestos fiber and metal powder uniformly dispersed therethrough in quantities of from 15% to 75% by weight of the facing, said metal powder consisting of particles of precast copper lead having a mesh size greater than 75 wherein the copper ranges from 50 to 80% by weight of each particle and wherein the lead makes up the remainder of each particle.

HAROLD W. SCHULTZ.

REFERENCES CITED

The following references are of record in the file of this patent:

UNITED STATES PATENTS

| Number | Name | Date |
|---|---|---|
| 1,635,653 | Williams | July 12, 1927 |
| 2,122,405 | Bockius | July 5, 1938 |
| 2,159,935 | Sanders | May 23, 1939 |
| 2,369,502 | Walker | Feb. 13, 1945 |
| 2,379,166 | Lucid | June 26, 1945 |
| 2,384,892 | Comstock | Sept. 18, 1945 |